United States Patent [19]
Sahay

[11] Patent Number: 5,715,504
[45] Date of Patent: Feb. 3, 1998

[54] MULTI-DIRECTIONAL PULSATING MAGNETIC BRUSH

[76] Inventor: Ravi B. Sahay, 9176 Danby Ct., San Diego, Calif. 92129

[21] Appl. No.: 644,459

[22] Filed: May 10, 1996

Related U.S. Application Data

[63] Continuation-in-part of Ser. No. 429,321, Apr. 26, 1995, Pat. No. 5,523,824.

[51] Int. Cl.$^6$ .................................................. G03G 15/09
[52] U.S. Cl. .................... 399/277; 118/623; 310/103; 399/267
[58] Field of Search .............................. 355/251, 253, 355/245; 118/657, 658, 623, 652; 430/122; 310/103, 105, 106; 399/229, 267, 277

[56] References Cited

U.S. PATENT DOCUMENTS

| | | | |
|---|---|---|---|
| 2,854,947 | 10/1958 | Giaimo, Jr. ........................... | 118/657 |
| 3,152,924 | 10/1964 | Wanielista et al. ..................... | 118/652 |
| 4,137,473 | 1/1979 | Pfister .................................. | 310/103 X |
| 4,139,296 | 2/1979 | Ruckdeschel .......................... | 355/253 |
| 4,189,654 | 2/1980 | Mourier ............................... | 310/103 X |
| 5,063,399 | 11/1991 | Zeman et al. ......................... | 355/251 X |
| 5,168,319 | 12/1992 | Kimura et al. ........................ | 355/326 |
| 5,321,475 | 6/1994 | Horiuchi et al. ....................... | 355/253 |
| 5,409,791 | 4/1995 | Kaukeinen et al. .................... | 430/54 |
| 5,469,245 | 11/1995 | Aoshima et al. ...................... | 355/251 |

FOREIGN PATENT DOCUMENTS

| | | |
|---|---|---|
| 57-101866 | 6/1982 | Japan. |
| 61-166569 | 7/1986 | Japan. |
| 2-239267 | 9/1990 | Japan. |
| 4-188174 | 7/1992 | Japan. |
| 6-161254 | 6/1994 | Japan. |

*Primary Examiner*—Arthur T. Grimley
*Assistant Examiner*—Sophia S. Chen
*Attorney, Agent, or Firm*—Frank G. Morkunas

[57] ABSTRACT

An electrically self-propelled pulsating multi-directional magnetic brush having an insert for use in toner deposition or removal devices associated with imaging machines of the electrostatic type (dry or liquid), the magnetic type, and the reprographic type. The insert further has skewed magnetic sections, made of permanent magnets or electro-magnets, therearound. The insert is used in conjunction with a permanent or electro-magnet and is contained within a rotatably mounted drum to provide an insulation for the drum and to further provide a driving force to uniformly rotate and multi-directionally pulsate developer mixture material around the drum.

23 Claims, 5 Drawing Sheets

MULTI-DIRECTIONAL PULSATING MAGNETIC BRUSH

CROSS REFERENCE AND RELATED APPLICATIONS

This application is a continuation-in-part of my U.S. patent application, for which I am a named co-inventor, Ser. No.08/429,321 filed on Apr.26, 1995 which became U.S. Pat. No. 5,523,824 on Jun. 4, 1996. I am the sole inventor of the improvements and embodiments contained in this continuation-in-part application.

BACKGROUND-FIELD OF INVENTION

This invention relates to an imaging machine of the electrostatic type (dry or liquid), specifically to a multi-directional, pulsating magnetic brush which provides for greater toner agitation by longitudinal and transverse toner tumbling for use in a toner deposition device or removal device.

BACKGROUND-DESCRIPTION OF PRIOR ART

An imaging machine of the electrostatic type employs a photoconductor which is typically acted upon by six process steps. These steps are charge, expose, toner deposition or development, transfer, residual toner removal or cleaning and erase.

Early electrostatic imaging machines carried out the development step using a process referred to as cascade development. Cascade development eventually gave way to an improvement referred to as magnetic brush development which has proved to be more reliable and capable of superior image quality. Magnetic brush type toner deposition devices serve to continuously attract and transport magnetic imaging material from a supply reservoir to the photoconductor and return unused or spent material to the reservoir.

Cleaning devices in imaging machines of the electrostatic type commonly employ mechanical means to remove residual toner from the surface of the photoconductor. Because mechanical means can damage the photoconductor surface, magnetic brush type cleaning is sometimes utilized.

U.S. Pat. No. 3,040,704 to Bliss, 1962 Jun.26 disclose the essential elements of current magnetic brush practice. This patent discloses the use of a non-rotating, cylindrical magnetic-field-producing structure (a permanent magnet) surrounded by a rotatable, non-magnetic drum which is driven by a suitable driving source, such as a motor of any known type. In this prior art invention, the magnetic poles on the permanent magnet are stationary and run parallel to each other along the axis. This configuration forms a linear brush perpendicular to the direction of the photoconductor movement.

U.S. Pat. No. 3,152,924 to Wanielista, 1964 October 13 discloses the essential elements of a different development with a rotating magnet instead of stationary magnet as noted above. This patent discloses the use of a rotating, cylindrical magnetic-field-producing structure surrounded by a rotatable or stationary, non-magnetic drum which is driven by a suitable driving source, such as a motor of any known type. In this prior art invention, the poles are straight and also run parallel to each other along the axis. This configuration forms an uniform brush around the circumference of the drum and the magnetic developer mixture (toner) tumbles in transverse relation to the movement of the photoconductor due to the changing magnetic field caused by the magnetic pole rotation.

Color capable imaging machines of the electrostatic type develop images using a plurality of magnetic brush type toner deposition devices. Typically, these machines possess one toner deposition device for each of four colors —cyan, magenta, yellow, and black. The machines act to sequentially deposit toner of the first color, followed by toner of the second color, followed by toner of the third color, followed by toner of the fourth color. To maximize image quality, only one magnetic brush is permitted to deposit toner images on the photoconductor at any given time either by the brush physically touching the photoconductor (contact-type) or by the brush being in close proximity but not touching the photoconductor (non-contact type).

In the traditional contact-type development process, this sequential imaging process is carried out by physically moving the first color magnetic brush close enough to touch the photoconductor only, followed by the second color magnetic brush only, followed by the third color magnetic brush only, followed by the fourth color magnetic brush only. The four images are transferred on the same paper sequentially in four steps so that the contacting magnetic brush is developing only one color image at any particular time.

In the non-contact development process, the sequential imaging process is carried out by use of sufficient energy to enable the first color magnetic brush to form the image on the photoconductor without touching the photoconductor, but by electronically 'jumping' onto the photoconductor, followed by the second non-contact color magnetic brush only, followed by the third non-contact color magnetic brush only, followed by the fourth non-contact color magnetic brush only. The four images are transferred and overlaid (image on image) first on the same area on the photoconductor in four steps to form the single color image. In this process, the non-contacting magnetic brush or electrostatic brush is used develop one color image on top of the next color. Due to the non-contact nature of the magnetic brush the image on the photoconductor is not smeared. Finally, the color image is transferred to a media or paper in one single step.

Though historically xerographic image forming apparatus generally have used stationary magnets and rotating drum-type devices in the development system where the magnetic brush makes physical contact with the photoconductor, future image-on-image non-contact based image development systems may potentially use the rotating magnet type as described in the patent below.

U.S. Pat. No. 5,409,791 to Kaukeinen et. al., 1995 Apr. 25, assigned to Eastman Kodak Co. shows a non-contact image-on-image rotating magnet type development system such that the second and a different color image on the photoconductor can be developed on top of the first color image without the magnetic brush touching the image. Image development is accomplished by a rapidly rotating magnet inside a rotating drum. The toner moves/tumbles vigorously in a wave-like motion in transverse relation to the movement of the photoconductor due to the changing and rapidly revolving magnetic field.

This prior art suffers from three disadvantages:

(a) the need for an external means for rotating the permanent magnet and the outer drum;

(b) making dynamic changes to the speed or direction of the magnet or the drum has to be accomplished by external means which can be expensive and less reliable; and (c) the magnetic brush uses rotating permanent magnets in which the poles run parallel to the axis thereby eliminating the possibility of making dynamic changes to the magnetic field strength along the axis in the event such changes improve image quality or efficiency.

U.S. Pat. No. 5,469,245 to Aoshima et. al., 1995 Nov. 21, assigned to Fuji Xerox Co. Ltd. also shows a non-contact image-on-image development system using a stationary magnet and a rotating drum such that the second and a different color image on the photoconductor can be developed on top of the first color image without the magnetic brush touching the developed image. The image development is accomplished by slowly rotating the outer drum with the stationary multi-pole magnet inside on which the toner forms a straight brush in the development zone. The toner in the magnetic brush tumbles in transverse relation to the movement of the photoconductor as the drum moves past the stationary magnet pole members due to the horizontal magnetic force applied by the adjacent magnet. Uniform thin layers of toner on the drum as created by the tumbling motion, is highly desirable in an image-on-image development system since only one or two top layers contribute to the development of the image. Tumbling reduces clumping of toner and permits finer deposition thereof at the point of development which makes for greater clarity of detail and development.

This prior art has following disadvantages:
(a) the magnetic brush uses permanent magnets that have non-uniformly spaced stationary magnetic poles.
(b) the outer rotating drum is driven through an external means;
(c) making dynamic changes to the speed or direction of the drum may disturb the flow and formation of the magnetic brush in the development zone;
(d) the magnet is complex to fabricate which can be expensive and the system operating tolerances can be narrow making it less reliable;
(e) the magnetic pole members have poles that are uniform and run parallel to the axis which requires intelligent placement of adjacent magnetic pole pieces; i.e., staggered or uneven, to cause finer toner rambling; and
(f) inability to produce longitudinal toner tumbling.

The co-pending application, Ser. No. 08/429,321, which became U.S. Pat. No. 5,523,824 on Jun. 4, 1996 which is incorporated by reference hereto, devised a self-propelled and switchable magnetic brush for use in black-and-white and color development. Although this magnetic brush invention was an improvement over the prior, like all of its prior art related devices, it does not provide adequate tumbling of the toner and developer material if the outer drum is made of a permanent magnet; it does not produce longitudinal tumbling; it is more expensive to build; and it may overheat which may require external cooling to maintain the temperature of the device at operable levels.

SUMMARY OF INVENTION

The above noted problems, and others, are overcome with the improved self-propelled switchable magnetic brush device with multi-directional toner flow/tumbling capabilities. This device provides an economical, reliable, and versatile alternative to what is currently being used. When the improved magnetic device is energized by an alternating current or a brushless direct current power source, the skewed magnetic sections on the insert (the insert may be inside or outside of a static electro-magnetic winding) cause the insert to self-propel. This results in the creation of the improved magnetic brush by increased toner tumbling (transversely and longitudinally) resulting in finer toner desposition.

This invention is applicable to any monochrome or multicolor image forming apparatus of magnetic, electrostatic (dry or liquid), or reprographic type. The image development system could be contact or non-contact type or of a single component or dual component type (which has both developer mixture and toner). The color image forming apparatus may develop all four colors on the photoconductor first before transferring it on media or it may develop each color on the photoconductor and then transfer it on the same media four times.

Accordingly, several objects and advantages of the present invention are:
(a) to provide uniform magnetic or electrostatic brush at low cost and high reliability;
(b) to provide developer mixture and toner tumbling properties in the magnetic brush in both longitudinal (across the width of the photoconductor perpendicular to its direction of travel) and transverse (across the direction of travel of the photoconductor parallel to its direction of travel) directions for greater toner pulsation/agitation/tumbling;
(c) to provide means for dynamically varying the speed, direction and intensity of the magnetic field and the outer drum should this prove advantageous for reasons of image quality or efficiency;
(d) to provide (a), (b) and (c) above with sufficient toner or developer mix flow rates so as to be functional in an imaging machine of the electrostatic type;
(e) to provide color development system with fewer parts and actuators and thereby reduce design, manufacturing, and maintenance costs;
(f) to provide smooth (less vibration) operation with color to color switching and thereby improve image quality;
(g) to eliminate the need to apply an external driving force to the development system;
(h) to require less energy to operate the electro-magnet, thereby causing less heat in operation; and
(i) to prevent toner clumping and provide for greater toner deposition at point of development.

DRAWING FIGURES

FIG. 1 shows an end view of the electrostatic type imaging process.

FIG. 2 shows an end view of various aspects of the current art magnetic brash practice.

FIG. 3A shows an end view of various aspects of one embodiment of the co-pending magnetic brash invention with the power source switched on.

FIG. 3B shows a non-circular configuration of the co-pending magnetic brash invention with power source on.

DETAILED DESCRIPTION OF THE DRAWINGS

Figures 1, 2, 3A, 3B:
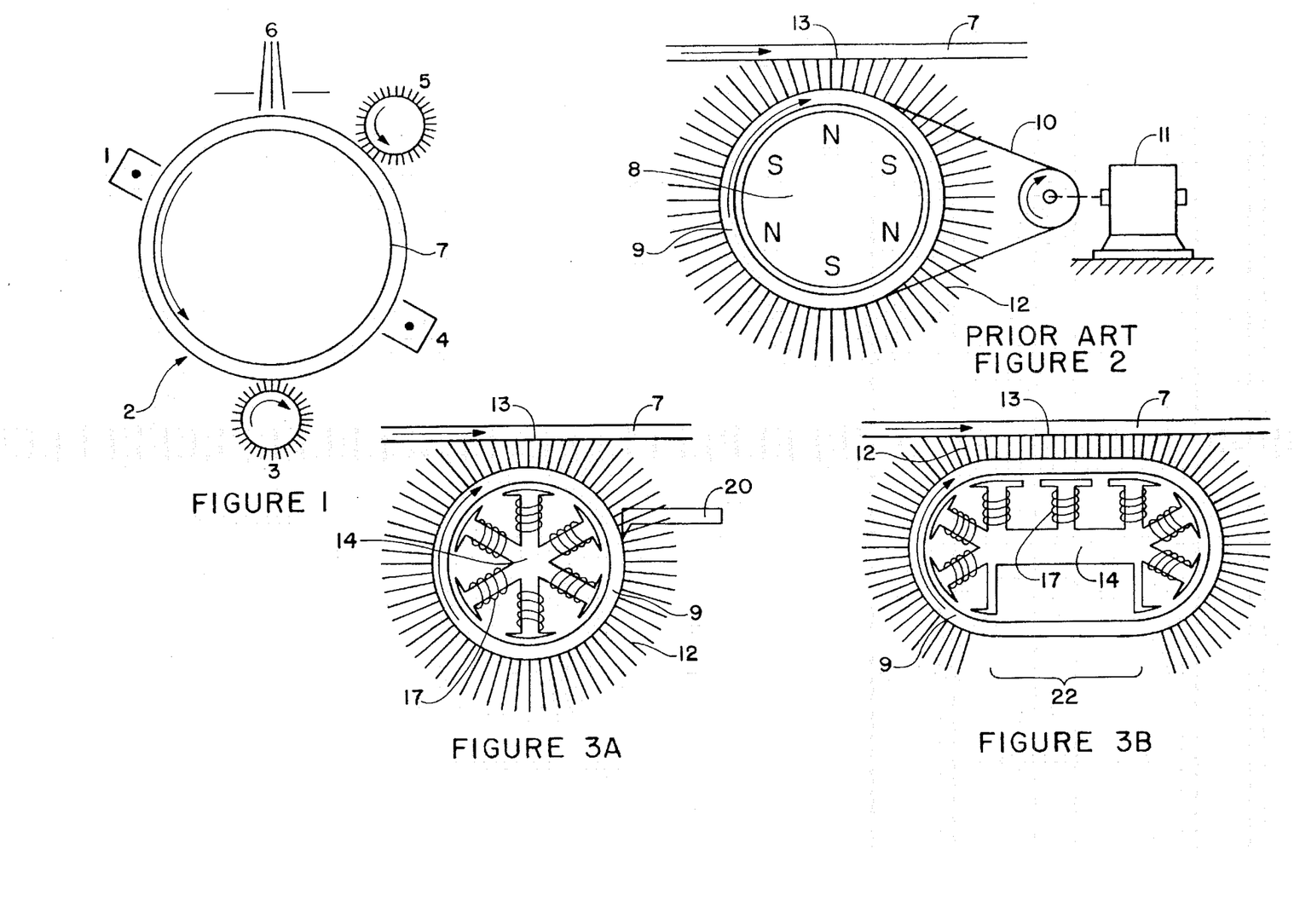

It should be noted that the drawings are not to scale but have been prepared to clearly show the inventive features. A typical electrostatic imaging process is shown in FIG. 1. This consists of a moving photoconductor 7 which is acted upon by six process steps. The steps begin with charge 1, followed by expose 2, followed by magnetic brush development 3, followed by transfer 4, followed by magnetic brush cleaning 5, and ending with erase 6. Charge 1 first uniformly charges the surface of moving photoconductor 7. At expose 2, a light source is directed at the photoconductor to selectively erase areas of surface charge and create a latent electrostatic image. At magnetic brush development 3, toner is attracted from a magnetic brush to the surface of moving photoconductor 7 by electrostatic forces. At transfer 4, toner is transferred from moving photoconductor 7 to paper. At magnetic brush cleaning 5, residual toner is attracted from the surface of moving photoconductor 7 to a magnetic brush. Finally, at erase 6, moving photoconductor 7 is flooded with light to eliminate the latent electrostatic image prior to the start of the Next imaging cycle.

Figure 4:
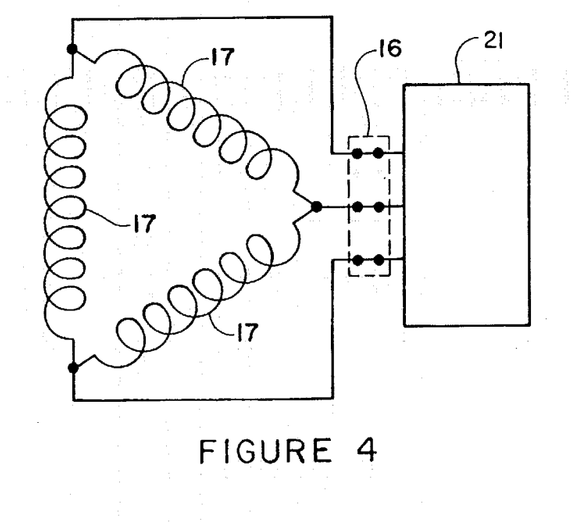
FIG. 4 shows a switchably controlled power source.

In one embodiment of the co-pending magnetic brush invention we have shown in FIG. 3A a stationary multi-pole electromagnet 14 having a plurality of electro-magnetic windings 17 and which is energized by the switchably controlled power source shown in FIG. 4. In that embodiment, power source 15 is a multi-phase alternating current power supply which generates a rotating magnetic field in stationary multi-pole electromagnet 14. The rotating magnetic field attracts magnetic imaging material to the surface of drum 9 and establishes a magnetic brush 12. Drum 9 could be a rotatable drum or tube-like structure, a fixed drum or tube-like structure, or an elongated drum (fixed or rotatable) or elongated tube-like structure (fixed or rotatable). Drum 9 could be magnetic or non-magnetic. Unless specifically referred to otherwise, in the following descriptions drum 9 will be of a rotatably mounted drum.

Simultaneously, the rotating magnetic field induces magnetic forces in rotatably mounted drum 9 which cause it to self rotate and follow the rotating magnetic field. The electro-magnetic field strength could be dynamically varied as could the electro-magnetic frequency. Such variances permit full, to partial, to no, magnetic brush development 22 (as shown in FIG. 3B) along any section of rotatably mounted drum 9. Such variances also permit magnetic brush cleaning 5 by reversal of the magnetic brush rotation as shown in FIG. 1. Due to friction between magnetic brush 12 and the surface of rotatably mounted drum 9 and the self rotation of rotatably mounted drum 9, magnetic imaging material is transported into magnetic-brush-to-photoconductor-contact-zone 13 (development zone). Electrostatic forces present in magnetic-brush-to-photoconductor-contact-zone 13 act to deposit toner on or remove toner from moving photoconductor 7.

Means for removing and reclaiming toner (toner removal means) may be any conventional mean, any mechanical means, or by at least one magnetic brush cleaning 5 positioned beyond transfer 4 as shown in FIG. 1. In this regard, and referring to FIGS. 1 and 3, as but one example, removing (or cleaning) toner from rotating photoconductor 7 is accomplished by passing magnetic brush 12 over the surface of rotating photoconductor 7 whereby magnetic brush 12, by magnetic attraction, removes (cleans) toner from the surface of rotating photoconductor 7 at magnetic-brush-to-photoconductor-contact-zone 13. Use of a mechanical removal means usually also entails use of permanent magnets rather than electromagnets and involves any mechanical means such as scraper 20. After removal of unused toner from photoconductor 7, unused toner is deposited in suitable reservoirs.

Figure 5:
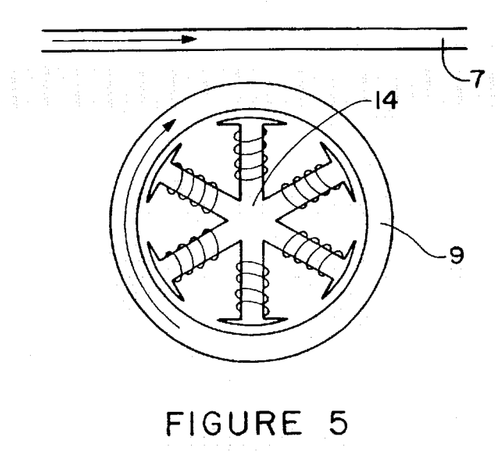
FIG. 5 shows an end view of various aspects of one embodiment of the co-pending magnetic brash invention with the power source switched off.

FIG. 5 shows an end view of this embodiment when switch 16 in FIG. 4 is open or switched off. In this condition, self rotation of rotatably mounted drum 9 ceases, and when drum 9 is made of non-magnetic material, magnetic brush 12 collapses, and magnetic-brush-to-photoconductor-contact-zone 13 (development zone) is eliminated.

Color to

Figure 6:
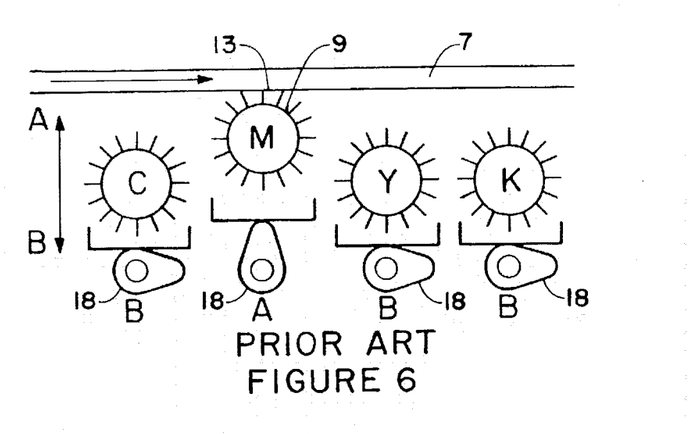
FIG. 6 shows an end view of the current art for a color electrostatic imager using electromechanical means to accomplish color switching.

Color switching is required in color imaging machines of the electrostatic type to minimize image degradation or reclaim color toner by engaging removal means suited for the intended purpose. Color to color switching is accomplished in current practice by sequentially creating magnetic-brush-to-photoconductor-contact-zone 13 for each color one at a time. Figure 6 shows a typical embodiment of current practice wherein electro-mechanical actuators 18 are employed to increase (movement in direction A) or decrease (movement in direction B) the spacing between rotatably mounted drums 9 and moving photoconductor 7 thereby creating magnetic-brush-to-photoconductor-contact-zone 13 one at a time to achieve this result.

Smooth color to color switching with minimum vibration is required in color imaging machines of the electrostatic type to minimize image degradation or reclaim color toner. FIG. 6 shows a typical embodiment of current practice in a contact-type development wherein electromechanical actuators 18 are employed to decrease the spacing between drum 9 and photoconductor 7 thereby creating magnetic brush 12 to contact development zone 13 one at a time to achieve this result.

In the magnetic brush invention, color-to-color switching can be enabled in one of several ways; by energizing of knife scrapper 20 to remove toner while the direction of the rotation of drum 9 is been reversed through switch 16 after magnetic brush 13 has been destroyed or by sequentially enabling the development of each color one at a time by switching the rotatable multi-pole electromagnet 14 of each color on or off as shown in FIGS. 3 and 5.

Figure 7:
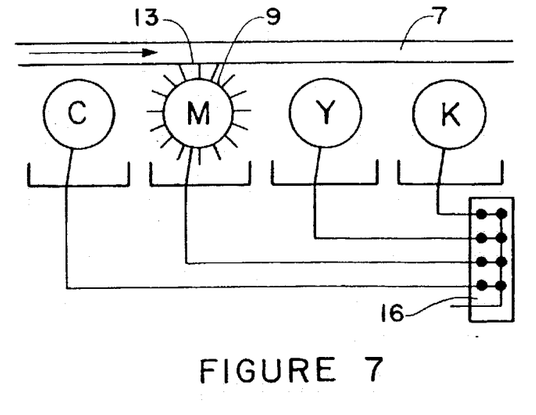
FIG. 7 shows an end view of one embodiment of the co-pending magnetic brash invention involving a color electrostatic imager to accomplish color switching.

FIG. 7 shows how this switching process is accomplished with this embodiment of the magnetic brush invention. As FIGS. 5 and 7 show, color to color switching is achieved by using switch 16 to sequentially energize stationary multi-pole electromagnet 14 for each color one at a time. Consequently, this embodiment of the co-pending magnetic brush invention simultaneously eliminates the need for an external driving force to propel rotatably mounted drum 9 and enables color to color switching by simple power supply switching as opposed to complex electro-mechanical means.

In a second embodiment of the magnetic brush invention, power source 21 was a brushless direct current power supply and drum 9 is made of magnetic material.

In a third embodiment of the magnetic brush invention, power source 21, was a direct current power supply and rotatably mounted drum 9 is propelled by an external driving force. In that embodiment, color to color switching was achieved by using switch 16 to sequentially energize stationary multi-pole electromagnet 14 for each color one at a time.

In a fourth embodiment of the magnetic brush invention, rotatably mounted drum 9 was replaced by a fixed drum. In that embodiment, color to color switching was achieved by using switch 16 to sequentially energize stationary multi-pole electromagnet 14 for each color one at a time.

In a fifth embodiment of the magnetic brush invention, rotatably mounted drum 9 was replaced by a belt supported by two or more rollers to illustrate extensibility to non-circular geometries.

Figure 8:
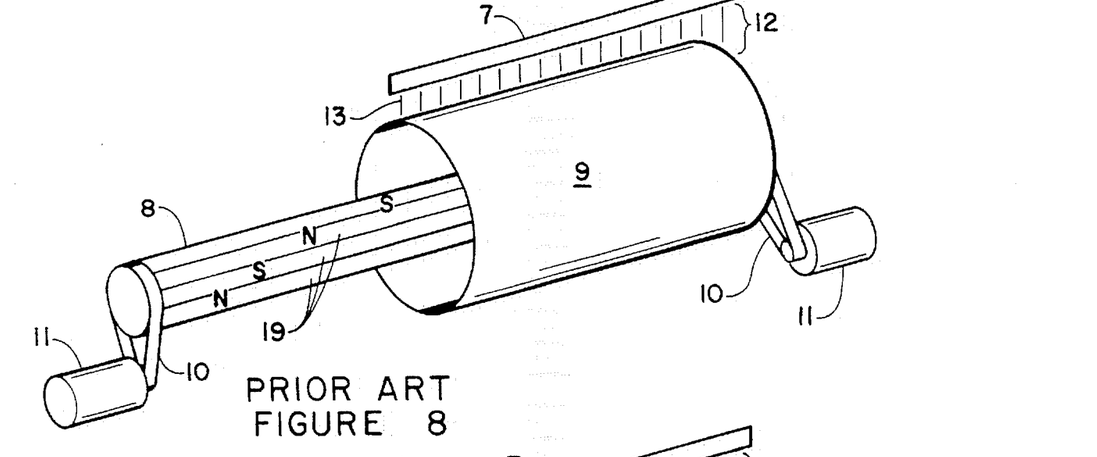
FIG. 8 shows a partially exploded perspective view of various aspects of current magnetic brash practice.
Figure 9:
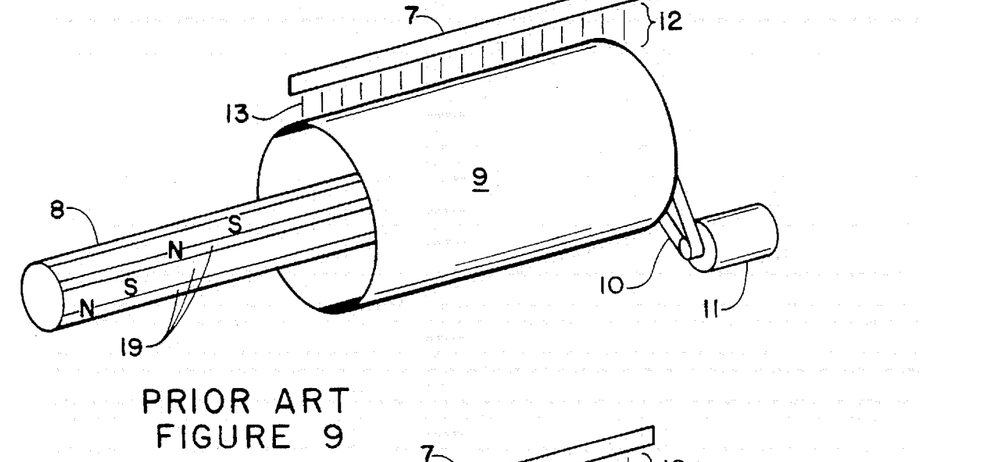
FIG. 9 shows a partially exploded perspective view of another aspect of current magnetic brush practice.

The self-propelling nature described in the embodiments above for a rotatably mounted drum may also be replaced by use of any suitable conventional means such motor as shown in FIGS. 2, 8, and 9.

In the prior art of FIG. 8 multi-pole permanent magnet 8 is surrounded by drum 9. Either magnet 8 or drum 9 or both can be rotatable or non-rotatable. Magnet 8 has parallel magnetic pole portions 19 running longitudinally across the width of magnet 8. The means for rotation is by an external mechanism applied either to rotatably mounted drum 9 or to magnet 8, such as by a suitable drive train 10 physically coupled to motor 11. In configurations where magnet 8 is rotatable, it establishes a thin uniform a magnetic brush with wave-like or tumbling agitation along the circumference of drum 9. This is caused by the rotation of magnet 8 within dram 9. The line of tumbling/agitation is transverse to and parallel with the direction of travel of a photoconductor. The magnetic brush 12 is attracted, by contact or non-contact electrostatic force, to development zone 13. In the recently developed image on image multi-color non-contact type magnetic brush devices, an external driving force is applied to rotate rotatably mounted drum 9. The rotating multi-pole permanent magnet 8, which attracts magnetic toner or developer mix to the surface of rotatably mounted drum 9, establishes a magnetic brush 12 with rapidly agitating waves on the surface of drum 9. Due to friction between magnetic brush 12, the surface of rotatably mounted drum 9, and the rotation of rotatably mounted dram 9 in relation to the rotating multi-pole permanent magnet 8 magnetic imaging material is transported and agitated to form a substantially uniform and agitating magnetic brush in the development zone 13. The line of tumbling/agitation is transverse to and parallel with the direction of travel of a photoconductor. Electrostatic forces present in magnetic brush at the development zone 13 act to deposit toner or remove toner from moving photoconductor 7.

In the prior art of FIG. 9 (which is functionally similar to that shown in FIG. 2), multi-pole permanent magnet 8 is stationary and is surrounded by a drum 9 which is rotatable. Rotatably mounted drum 9 is driven by a suitable external drive train 10 which is physically coupled to a motor 11. Drum 9 and the stationary multi-pole permanent magnet 8 are so positioned and oriented as to establish a magnetic brush 12 in the development zone 13. In configurations having a stationary permanent magnet, proper toner agitation is virtually non-existent. The developer mixture and toner particles as formed by the magnetic brush near the development zone 13 are made to tumble, however, transversely across the direction of travel of the photoconductor (perpendicular to its direction of travel) by the uneven or staggered spacing of the magnetic pole portions 19 in the multi-pole magnet 8. Though tumbling occurs, it too is somewhat limited. Due to friction between magnetic brush 12, the surface of rotatably mounted drum 9, and the rotation of rotatably mounted drum 9 magnetic imaging material is transported into magnetic brush 12 to development zone 13. Electrostatic forces present in development zone 13 act to deposit toner on or remove toner from moving photoconductor 7.

Figure 10:
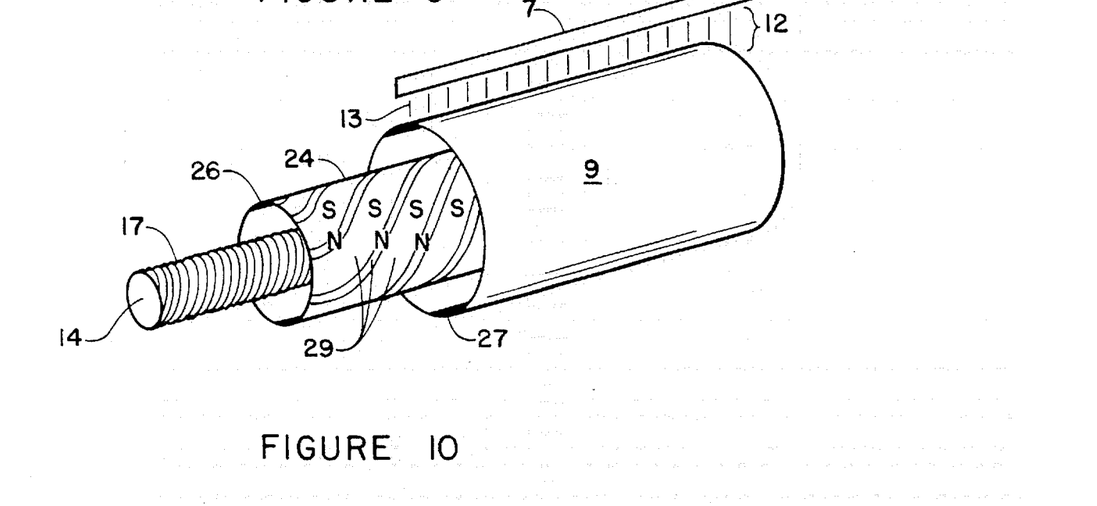
FIG. 10 shows a partially exploded perspective view of various aspects of one embodiment of this invention having an external insert.
Figure 14:
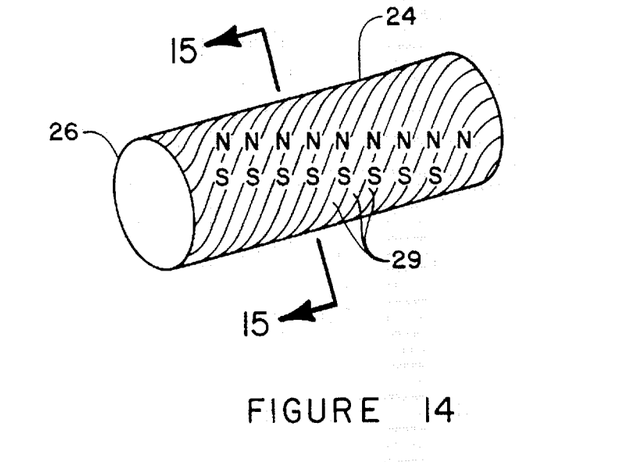
FIG. 14 shows the insert.
Figure 15:
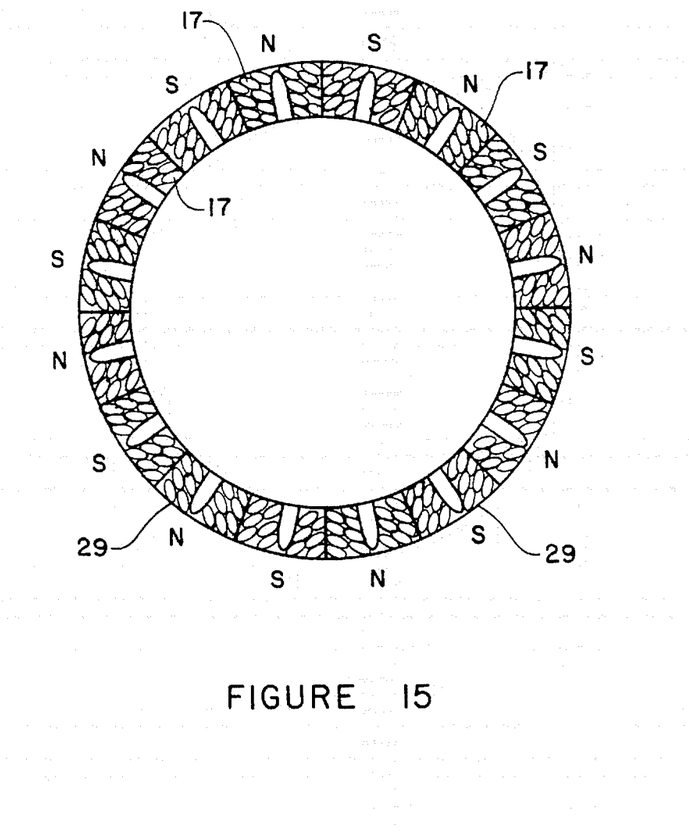
FIG. 15, taken on line 15-15 of FIG. 14, shows the electro-magnetic windings of the magnetic sections.

Referring now to FIG. 10, the present invention embodies features of the co-pending magnetic brush invention as shown in FIGS. 3A, 3B, 4, 5, and 7. Drum 9 can be rotatable, rotatably mounted, or stationary. It can be made of magnetic or non-magnetic material. Within drum 9 is insert 24 which is hollow and cylindrical, has an outer surface, and has at least one magnetic section 29 on its outer surface. Multiple magnetic sections are preferred. Magnetic sections 29 run substantially the full width of drum 9 which itself encompasses at least the full width of the development zone 13. Magnetic section 29 and insert 24 may be longer than development zone 13 but generally should not be shorter than development zone 13. Magnetic sections 29 alternate in polarity around the circumference of insert 24, are skewed or twisted in torque-like fashion, and may be parallel or non-parallel to each other. They may be permanent magnets or as illustrated in FIG. 14, may be electro-magnets.

Within the hollow chamber of insert 24 is electro-magnet 14 having one or more electro-magnet winding 17 thereon. Energy may be applied to electro-magnet 14 in a variety of means in varying degrees. Similarly, energy may be applied to magnetic sections 29 where such are electromagnets rather than permanent magnets. One such energy application is shown in FIG. 4 which reflects a three-phase power supply 21 with switch 16. Such energy is applied such that the magnetic force created around electro-magnet 14 revolves or rotates. This magnetic rotation attracts to magnetic sections 29 causing insert 24 to rotate around electro-magnet 14. The magnetic force and rotation of insert 24 is sufficient to rotate drum 9, in such case where drum 9 is rotatably mounted, and to attract toner and create magnetic brush 12. Whether in a contact or non-contact configuration, magnetic brush 12 engages development zone 13 to effect deposition and development.

Skewing of magnetic sections 29 causes toner to tumble (while insert 24 is rotating), not only transversely across the direction of travel of drum 9 and parallel thereto, but also longitudinally across the width of drum 9 and perpendicular to its direction of travel, thereby causing toner to agitate or pulsate more vigorously and more uniformly. This multi-directional tumbling and agitating reduces toner clumping, establishes finer toner particle disposition, and produces greater clarity and detail in imagery. Skewing may be consistent throughout the length of insert 24 or may be less skewed at insert first end 26 which is adjacent to drum first end 27. It is best described by example. If magnetic sections 29 ran straight across the length of insert 24 beginning at insert first end 26 and terminating at the oppositve end, said sections would be skewed by keeping insert first end 26 stationary and rotating the opposite end by any number of degrees from about 1 degree to about 360 degrees. Magnetic sections 29 would then skew or curve in a substantially spiral or wavelike fashion around insert 24. The amount the opposite end of insert 24 is rotated is referred to skew angle. The result on magnetic sections 29 is referred to as skew slope.

Skew slope (SS) is derived from the change in height divided by change in length of magnetic sections 29 around insert 24 (SS=ΔH/ΔL). In addition to skew slope rotation speed of insert 24 can affect tumbling qualities. Good tumbling action results from a skew slope of between about 0.01 to about 2.50. Better tumbling results from a skew slope of between about 0.01 to about 0.10. Best results are achieved from a skew slope of between about 0.01 to about 0.05. The skew slope at insert first end 26 need not be the same as the skew slope on the remainder of insert 24. Smooth rotating and good tumbling action results from a skew slope of between about 0.01 to about 0.60 at insert first end 26. Smooth rotating and better tumbling results from a skew slope of between about 0.10 to about 0.50 at insert first end 26. Best results are achieved from a skew slope of between about 0.15 to about 0.25 at insert first end 26. Likewise, in order to provide varying tumbling in the transverse direction, the number of magnetic section 29 pole transitions per second in development zone 13, in relation to drum 9, may be equal to the total number of poles divided by the relative speed of the rotation of insert 24 in relation to drum 9.

In normal operation of switchable magnetic brush of this configuration, electro-magnet 14 tends to heat up and overheat. The incorporation of insert 24 acts to insulate drum 9 from such heating and the problems associated therewith. Such problematic heat generation also may be reduced or eliminated by using an electro-magnet of lesser length than the width of development zone 13 as shown in FIGS. 12 and 13.

In these embodiments electro-magnet 14 does not run the full length of drum 9, insert 24, or the full width of development zone 13. It has been found that where electro-magnet 14 is less, to substantially less, than such lengths and distances, it can still provide sufficient magnetic force to cause insert 24 to rotate. The less in length that electro-magnet 14 is, the less wire winding that is necessary for electro-magnet which results in less heat generation. The less heat that is generated, the less insulation that is required of insert 24 and is less costly to manufacture.

Figure 12:
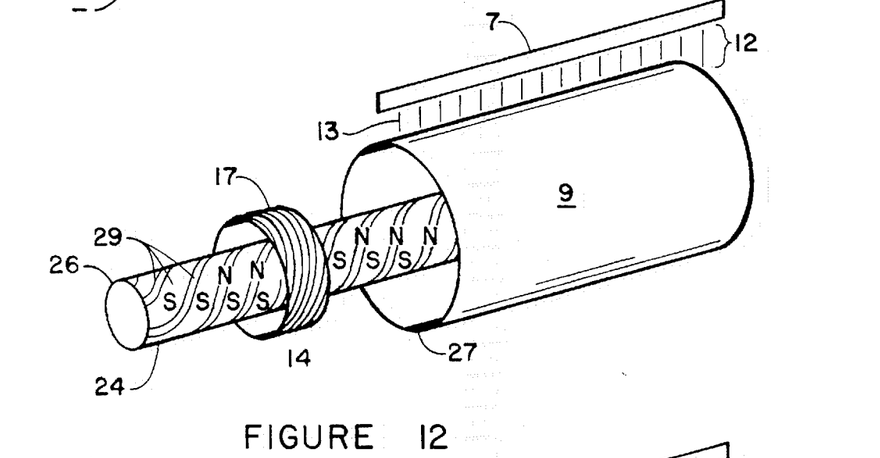
FIG. 12 is a partially exploded perspective view of various aspects of one embodiment of this invention with an internal insert.
Figure 13:
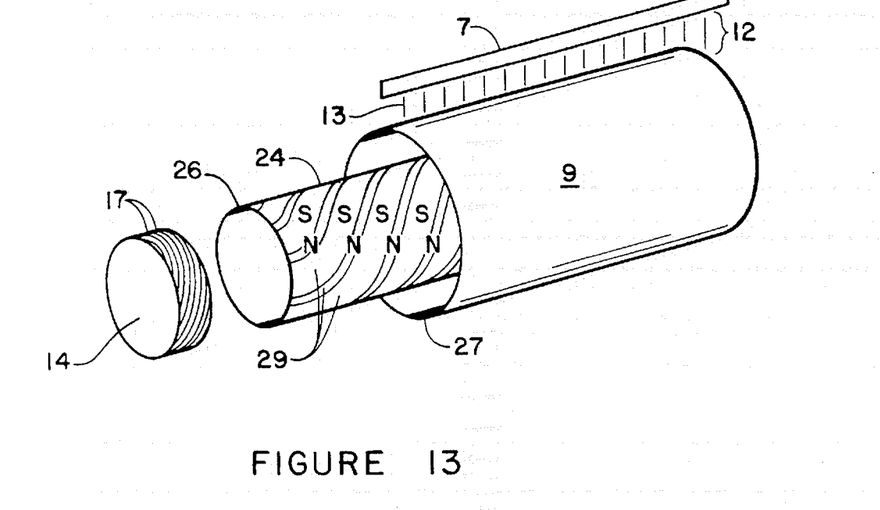
FIG. 13 is a partially exploded perspective view of FIG. 10 showing a smaller electromagnet.

Electro-magnet 14 may also be substantially hollow and be shorter in length than insert 24 as shown in FIG. 12. In this embodiment, insert 24 lies within electro-magnet 14 and is rotated when energy is applied to electro-magnet 14. In FIG. 13, electro-magnet is also shorter in length than insert 24 and may lie either inside insert 24 or at insert first end 26. As in other embodiments of the present invention, insert 24 may run the full length of drum 9 or the width of development zone 13. Electro-magnet 14 may also be substantially shorter in length (as shown in FIGS. 12 and 13) to enjoy the benefits described above.

Figure 11:
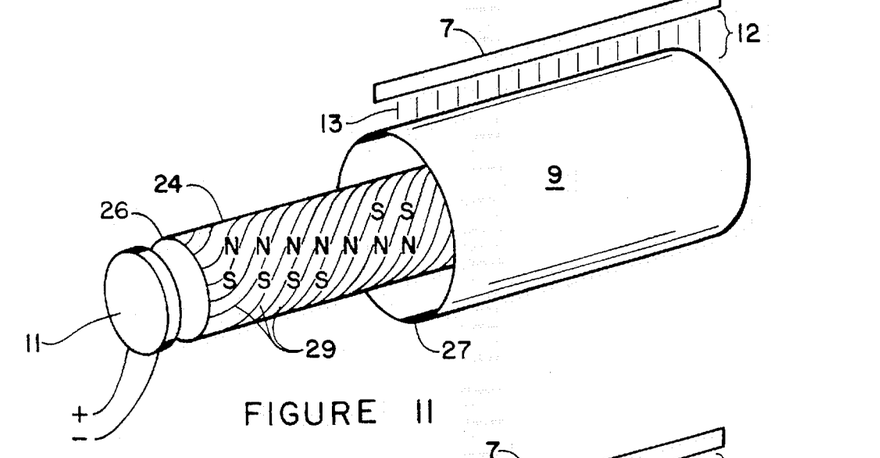
FIG. 11 shows a partially exploded view of FIG. 10, without electro-magnet, showing an end cap motor in its place.

Electro-magnet may be eliminated altogether thereby further reducing or eliminating heat generation through operation. This is shown in Figure 11. In this embodiment, motor 11 may be attached directly to insert 24 or by suitable drive train 10 and motor 11. By such configuration, electro-magnet 14 is eliminated and motor 11 provides the rotation for insert 24.

Consequently, although the present invention maintains the switchable magnetic brush qualities of the co-pending magnetic brush invention, it also solves some of the heat problems and lack of complete, multi-directional tumbling properties associated with it and prior art inventions finer toner deposition is achieved and maintained through the multi-directional toner tumbling characteristics and heat insulation of the present invention. Better toner deposition with less heat generated and less material for production yield a more economical device possessing better reproduction qualities.

Accordingly, the reader will see that the use of an insert with skewed magnetic sections thereon, in conjunction with the improved magnetic and non-magnetic brush device, provides an economical, reliable, and versatile alternative to current practice and a better overall developed product.

While the above description contains many specificities, these should not be construed as limitations on the scope of the invention, but rather as an exemplification of several embodiments thereof. Accordingly, the scope of the invention should be determined not by the embodiments illustrated, but by the appended claims and their legal equivalents.

We claim:

1. An improved switchable magnetic brush for use in an electrostatic imaging apparatus having a drum for carrying imaging material to a photoconductor, a development zone between the drum and the photoconductor, one or more electro-magnets within the drum, and a switchably controlled power source for the one or more electro-magnets, the improvement comprising: the improvement comprising:

means for agitating toner multi-directionally such that the toner tumbles transversely across the direction of travel of the photoconductor and tumbles longitudinally and in perpendicular relation to the direction of travel of the photoconductor, said agitation means contained within the drum; and means for insulating heat from the photoconductor and development zone as generated by the one or more electro-magnets, said insulation means having a hollow core and an outer surface and being contained within the drum.

2. The device as described in claim 1 wherein said agitation means comprise one or more substantially skewed magnetic sections on the outer surface of said insulation means.

3. The device as described in claim 2 wherein said one or more magnetic sections are permanent magnets.

4. The device as described in claim 2 wherein said one or more magnetic sections are switchably controlled electro-magnets.

5. The device as described in claim 1 wherein said insulation means and agitation means are rotatable and rotated by switchably controlling the one or more electro-magnets.

6. The device as described in claim 1 wherein the one or more electro-magnets used for rotating said insulation means and said agitation means is contained within the hollow core of said insulation means.

7. The device as described in claim 1 wherein the one or more electro-magnets used for rotating said insulation means and said agitation means is substantially shorter in length than said insulation means.

8. The device as described in claim 1 further having a means for removing imaging material.

9. The device as described in claim 8 wherein said imaging removal means comprises a scraper.

10. An improved switchable magnetic brush for use in an electrostatic imaging apparatus having a drum for carrying imaging material to a photoconductor, a development zone between the drum and the photoconductor, one or more electro-magnets within the drum, and a switchably controlled power source for the one or more electro-magnets, the improvement comprising:

an insert having a hollow core and an outside surface, said insert being contained within the drum, said insert further is rotatable and rotated by switchably controlling the one or more electro-magnets; and one or more substantially skewed magnetic sections on the outer surface of said insert configured such that toner agitates and tumbles multi-directionally on said outside surface of said insert both in a direction parallel to the direction of travel of the photoconductor and in perpendicular relation to the direction of travel of the photoconductor.

11. The device described in claim 10 wherein said one or more magnetic sections are permanent magnets.

12. The device described in claim 10 wherein said one or more magnetic sections are switchable controlled electro-magnets.

13. The device described in claim 10 wherein the one or more electro-magnets used for rotating said insert is contained within the hollow core of said insert.

14. The device described in claim 10 wherein the one or more electro-magnets used for rotating said insert is substantially shorter in length than said insert.

15. The device described in claim 10 wherein the one or more electro-magnets used for rotating said insert has an inner chamber.

16. The device described in claim 15 where in said insert is contained within the inner chamber of the one or more electro-magnets used for rotating said insert.

17. The device described in claim 15 wherein the one or more electro-magnets used for rotating said insert is substantially shorter in length than said insert.

18. The device as described in claim 10 further having a means for removing imaging material.

19. The device as described in claim 18 wherein said imaging removal means comprises a scraper.

20. An improved magnetic brush for use in an electrostatic imaging apparatus having a drum for carrying imaging material to a photoconductor, a development zone between the drum and the photoconductor, a switchably controlled power source for at least one electro-magnets, and a motor, the improvement comprising:

an insert having a hollow core and an outside surface, said insert being contained within the drum; and one or more substantially skewed magnetic sections on the outer surface of said insert configured such that toner agitates and tumbles multi-directionally on said outside surface of said insert both in a direction parallel to the direction of travel of the photoconductor and in perpendicular relation to the direction of travel of the photoconductor, said one or more magnetic sections are switchably controlled electro-magnets.

21. The device as described in claim 20 wherein said insert is rotatable and rotated by the motor.

22. The device as described in claim 20 further having a means for removing imaging material.

23. The device as described in claim 22 wherein said imaging removal means comprises a scraper.

* * * * *